US010924987B2

(12) United States Patent
Yong et al.

(10) Patent No.: US 10,924,987 B2
(45) Date of Patent: Feb. 16, 2021

(54) FTM BASED SECURE RANGING ERROR RECOVERY

(71) Applicant: Apple Inc., Cupertino, CA (US)

(72) Inventors: Su Khiong Yong, Palo Alto, CA (US); Christiaan A. Hartman, San Jose, CA (US); Jarkko L. Knecht, Los Gatos, CA (US); Mingguang Xu, San Jose, CA (US); Mithat C. Dogan, San Jose, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/564,259

(22) Filed: Sep. 9, 2019

(65) Prior Publication Data

US 2020/0084706 A1     Mar. 12, 2020

Related U.S. Application Data

(60) Provisional application No. 62/728,918, filed on Sep. 10, 2018.

(51) Int. Cl.
*H04W 48/16* (2009.01)
*H04W 64/00* (2009.01)
(Continued)

(52) U.S. Cl.
CPC .......... *H04W 48/16* (2013.01); *H04B 17/373* (2015.01); *H04L 43/0864* (2013.01); *H04W 64/003* (2013.01)

(58) Field of Classification Search
CPC .......... H04W 48/16; H04W 64/003; H04L 43/0864; H04B 17/373
See application file for complete search history.

(56) References Cited

U.S. PATENT DOCUMENTS 7,995,644 B2 * 8/2011 Sahinoglu ............ H04B 1/7163
375/221
10,298,337 B2 * 5/2019 Kuchler ................. G01S 13/765
(Continued)

FOREIGN PATENT DOCUMENTS

WO    WO2018048775 A2    3/2018
WO    WO2018081100 A1    5/2018

OTHER PUBLICATIONS

Seok et al.; "802.11az Range Measurement Protocol Update"; IEEE 802.11-18/0729r0; https://mentor.ieee.org/802.11/dcn/18/11-18-0729-01-00az-range-measurement-protocol-update.doc; IEEE Standards Association; May 4, 2018; 5 pages.

*Primary Examiner* — Rasheed Gidado
(74) *Attorney, Agent, or Firm* — Kowert, Hood, Munyon, Rankin & Goetzel, P.C.

(57) ABSTRACT

Methods for performing error recovery during a ranging procedure may include negotiation one or more ranging parameters, including a set of secure training sequences and receipt of a first ranging frame that may include a first dialog token and may have an appended first secure training sequence. The first ranging frame may be decoded based on the first dialog token but not correlated based on the first secure training sequence. A first acknowledgment that may include an appended second secure training sequence may be transmitted. The second secure training sequence may be associated with a prior dialog token. A second ranging frame that may include a second dialog token and may have an appended third secure training sequence may be received. The second ranging frame may be decoded based on the third dialog token and correlated based on the third secure training sequence.

20 Claims, 13 Drawing Sheets

(51) Int. Cl.
*H04L 12/26* (2006.01)
*H04B 17/373* (2015.01)

(56) References Cited

U.S. PATENT DOCUMENTS

| | | | | |
|---|---|---|---|---|
| 10,447,725 B1* | 10/2019 | Xu | ............ | H04W 12/12 |
| 10,660,085 B2* | 5/2020 | Xu | ............ | H04L 25/0224 |
| 10,694,407 B2* | 6/2020 | Seok | ............ | H04W 4/025 |
| 10,735,163 B2* | 8/2020 | Berger | ............ | H04L 27/2605 |
| 2018/0227714 A1 | 8/2018 | Lee | | |
| 2019/0036739 A1* | 1/2019 | Lindskog | ............ | H04L 9/0819 |

* cited by examiner

US 10,924,987 B2

FTM BASED SECURE RANGING ERROR RECOVERY

PRIORITY DATA

This application claims benefit of priority to U.S. Provisional Application Ser. No. 62/728,918, titled "FTM Based Secure Ranging Error Recovery", filed Sep. 10, 2018, by Su Khiong Yong, Christiaan A. Hartman, Jarkko L. Kneckt, Mingguang Xu, Mithat C. Dogan, and Yong Liu, which is hereby incorporated by reference in its entirety as though fully and completely set forth herein.

FIELD

The present application relates to wireless communications, including techniques for wireless communication among wireless stations in a wireless networking system, including error recovery during secure ranging based on fine timing measurements.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. Ranging can provide the distance between one wireless device and another (e.g., the distance between wireless nodes and/or wireless stations). However, in existing wireless communication technologies ranging sensitivity may be bounded by data decode sensitivity. Accordingly, improvements in the field are desired.

SUMMARY

Embodiments described herein relate to error recovery during secure ranging between wireless devices.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, a wireless device may be configured to negotiate one or more ranging parameters that may include at least a set of secure training sequences. In addition, the wireless device may receive a first ranging frame that may include a first dialog token. A first secure training sequence of the set of secure training sequences may appended to the first ranging frame. The wireless device may determine that the first ranging frame can be decoded based on the first dialog token but not correlated based on the first secure training sequence. The wireless device may transmit a first acknowledgment. A second secure training sequence of the set of secure training sequences may be appended to the first acknowledgment and the second secure training sequence may be associated with a prior dialog token. The wireless device may receive a second ranging frame that may include a second dialog token. A third secure training sequence of the set of secure training sequences may be appended to the second ranging frame. The wireless device may determine that the second ranging frame can be decoded based on the third dialog token and correlated based on the third secure training sequence.

In some embodiments, a wireless device may negotiate one or more ranging parameters that may include at least a set of secure training sequences and may transmit a first ranging frame that may include a first dialog token. A first secure training sequence of the set of secure training sequences may be appended to the first ranging frame. The wireless device may transmit a second ranging frame that may include a second dialog token. A second secure training sequence of the set of secure training sequences may be appended to the second ranging frame. The wireless device may receive a first acknowledgment. A third secure training sequence of the set of secure training sequences may be appended to the first acknowledgment and the third secure training sequence may be associated with the first dialog token. The wireless device may determine that the first acknowledgment can be decoded but cannot be correlated based on the third secure training sequence and may transmit a third ranging frame that may include a third dialog token. A fourth secure training sequence of the set of secure training sequences may be appended to the third ranging frame.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1A:
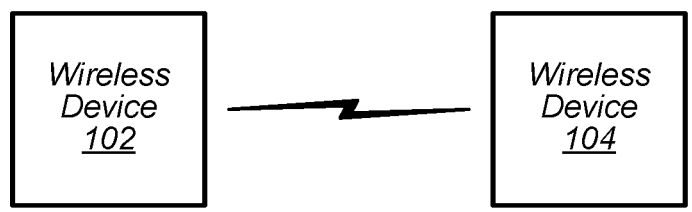
FIG. 1A illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
TX: Transmission/Transmit
RX: Reception/Receive
LAN: Local Area Network
WLAN: Wireless LAN
RAT: Radio Access Technology
TTL: time to live
SU: Single user
MU: Multi user
NDP: Null Data Packet
NDPA: NDP Announcement
VHT: 802.11 very high throughput
VHTz: NDP sounding-based 802.11az SU protocol
iSTA: Initiating station of a ranging procedure
rSTA: Responding station of a ranging procedure
ToA: time of arrival of a packet
ToD: time of departure of a packet
LMR: location measurement report
SIFS: short interframe space
FTM: fine timing measurement

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
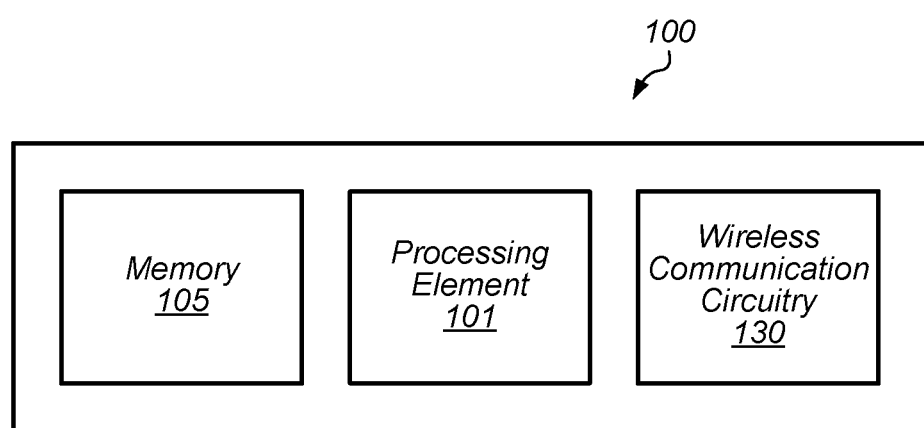
FIG. 1B illustrates an example simplified block diagram of a wireless device, according to some embodiments.

FIGS. 1A-1B—Wireless Communication System

FIG. 1A illustrates an exemplary (and simplified) wireless communication system in which aspects of this disclosure may be implemented. It is noted that the system of FIG. 1A is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, handheld device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1A. For example, a wireless device (e.g., either of wireless devices 102 or 104) may perform error recovery for a ranging procedure. Thus, in some embodiments, the wireless device may be configured to negotiate one or more ranging parameters that may include at least a set of secure training sequences. In addition, the wireless device may receive a first ranging frame that may include a first dialog token. A first secure training sequence of the set of secure training sequences may appended to the first ranging frame. The wireless device may determine that the first ranging frame can be decoded based on the first dialog token but not correlated based on the first secure training sequence. The wireless device may transmit a first acknowledgment. A second secure training sequence of the set of secure training sequences may be appended to the first acknowledgment and the second secure training sequence may be associated with a prior dialog token. The wireless device may receive a second ranging frame that may include a second dialog token. A third secure training sequence of the set of secure training sequences may be appended to the second ranging frame. The wireless device may determine that the second ranging frame can be decoded based on the third dialog token and correlated based on the third secure training sequence.

In some embodiments, a wireless device may negotiate one or more ranging parameters that may include at least a set of secure training sequences and may transmit a first ranging frame that may include a first dialog token. A first secure training sequence of the set of secure training sequences may be appended to the first ranging frame. The wireless device may transmit a second ranging frame that may include a second dialog token. A second secure training sequence of the set of secure training sequences may be appended to the second ranging frame. The wireless device may receive a first acknowledgment. A third secure training sequence of the set of secure training sequences may be appended to the first acknowledgment and the third secure training sequence may be associated with the first dialog token. The wireless device may determine that the first acknowledgment can be decoded but cannot be correlated based on the third secure training sequence and may transmit a third ranging frame that may include a third dialog token. A fourth secure training sequence of the set of secure training sequences may be appended to the third ranging frame.

FIG. 1B illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 10. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

Figure 1C:
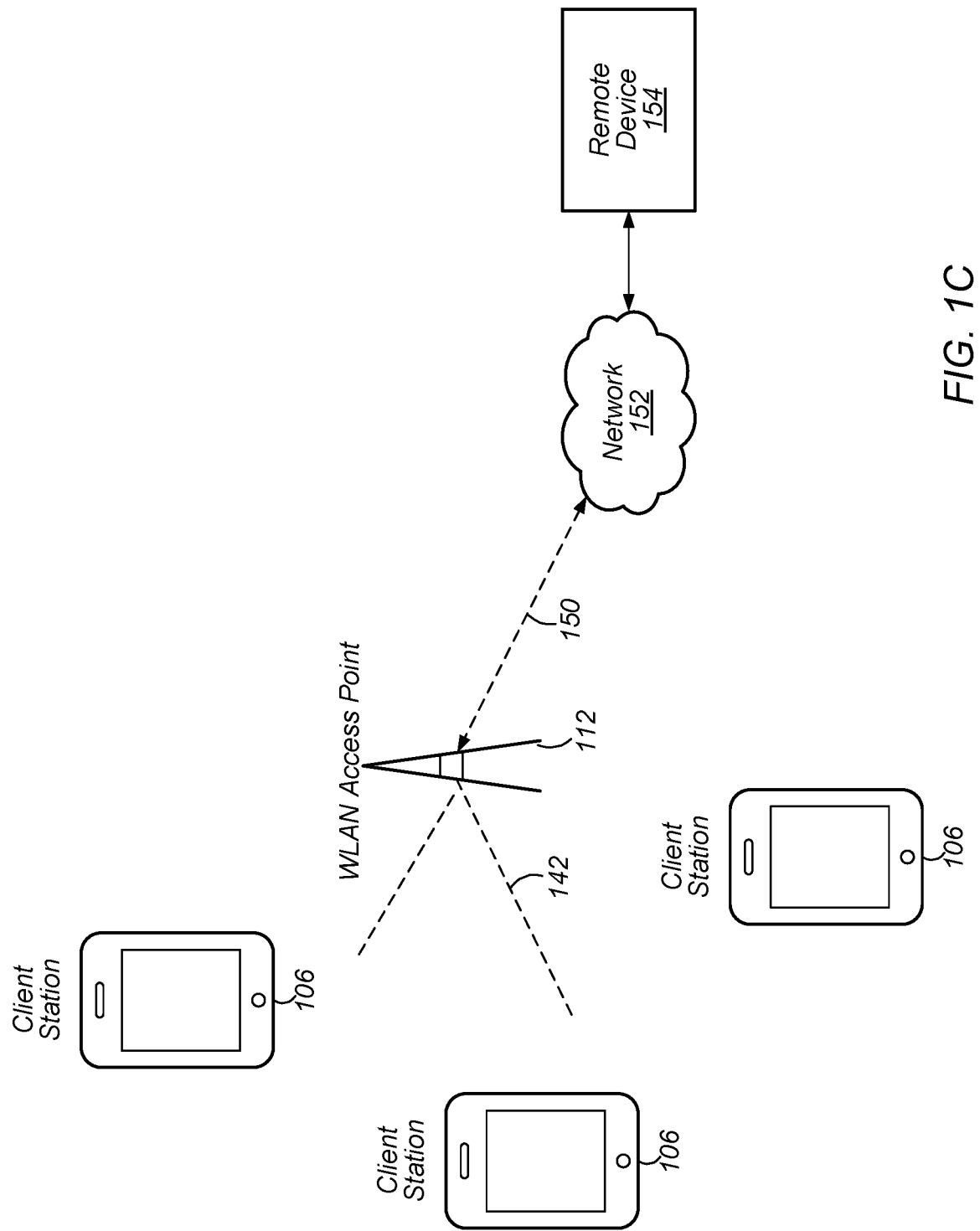
FIG. 1C illustrates an example WLAN communication system, according to some embodiments.

FIG. 1C—WLAN System

FIG. 1C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 (which may be an exemplary implementation of device 100) may be configured to perform error recovery for a ranging procedure. Thus, in some embodiments, the wireless device 106 may be configured to negotiate one or more ranging parameters that may include at least a set of secure training sequences. In addition, the wireless device 106 may receive a first ranging frame that may include a first dialog token. A first secure training sequence of the set of secure training sequences may appended to the first ranging frame. The wireless device 106 may determine that the first ranging frame can be decoded based on the first dialog token but not correlated based on the first secure training sequence. The wireless device 106 may transmit a first acknowledgment. A second secure training sequence of the set of secure training sequences may be appended to the first acknowledgment and the second secure training sequence may be associated with a prior dialog token. The wireless device 106 may receive a second ranging frame that may include a second dialog token. A third secure training sequence of the set of secure training sequences may be appended to the second ranging frame. The wireless device 106 may determine that the second ranging frame can be decoded based on the third dialog token and correlated based on the third secure training sequence.

In some embodiments, a wireless device 106 may negotiate one or more ranging parameters that may include at least a set of secure training sequences and may transmit a first ranging frame that may include a first dialog token. A first secure training sequence of the set of secure training sequences may be appended to the first ranging frame. The wireless device 106 may transmit a second ranging frame that may include a second dialog token. A second secure training sequence of the set of secure training sequences may be appended to the second ranging frame. The wireless device 106 may receive a first acknowledgment. A third secure training sequence of the set of secure training sequences may be appended to the first acknowledgment and the third secure training sequence may be associated with the first dialog token. The wireless device 106 may determine that the first acknowledgment can be decoded but cannot be correlated based on the third secure training sequence and may transmit a third ranging frame that may include a third dialog token. A fourth secure training sequence of the set of secure training sequences may be appended to the third ranging frame.

Figure 2:
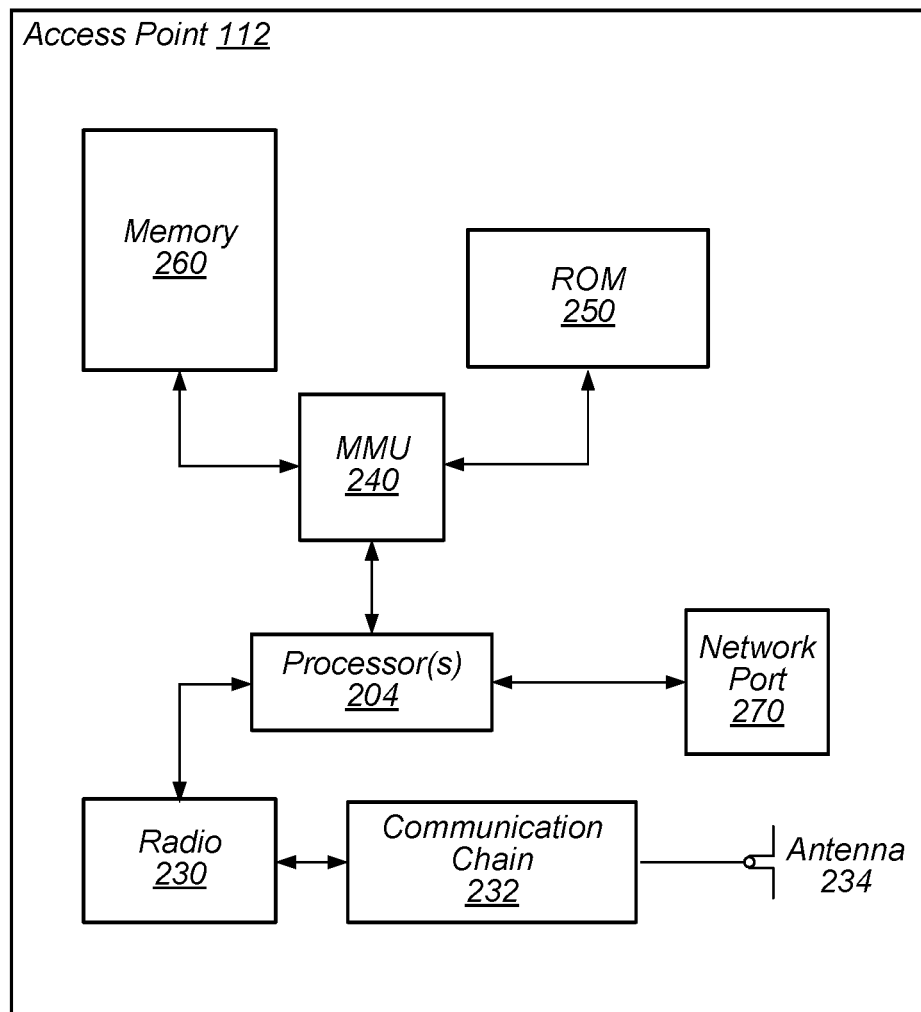
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112, which may be one possible exemplary implementation of the device 100 illustrated in FIG. 1B. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform error recovery for a ranging procedure. Thus, in some embodiments, the AP 112 may be configured to negotiate one or more ranging parameters that may include at least a set of secure training sequences. In addition, the AP 112 may receive a first ranging frame that may include a first dialog token. A first secure training sequence of the set of secure training sequences may appended to the first ranging frame. The AP 112 may determine that the first ranging frame can be decoded based on the first dialog token but not correlated based on the first secure training sequence. The AP 112 may transmit a first acknowledgment. A second secure training sequence of the set of secure training sequences may be appended to the first acknowledgment and the second secure training sequence may be associated with a prior dialog token. The AP 112 may receive a second ranging frame that may include a second dialog token. A third secure training sequence of the set of secure training sequences may be appended to the second ranging frame. The AP 112 may determine that the second ranging frame can be decoded based on the third dialog token and correlated based on the third secure training sequence.

In some embodiments, an AP 112 may negotiate one or more ranging parameters that may include at least a set of secure training sequences and may transmit a first ranging frame that may include a first dialog token. A first secure training sequence of the set of secure training sequences may be appended to the first ranging frame. The AP 112 may transmit a second ranging frame that may include a second dialog token. A second secure training sequence of the set of secure training sequences may be appended to the second ranging frame. The AP 112 may receive a first acknowledgment. A third secure training sequence of the set of secure training sequences may be appended to the first acknowledgment and the third secure training sequence may be associated with the first dialog token. The AP 112 may determine that the first acknowledgment can be decoded but cannot be correlated based on the third secure training sequence and may transmit a third ranging frame that may include a third dialog token. A fourth secure training sequence of the set of secure training sequences may be appended to the third ranging frame.

Figure 3A:
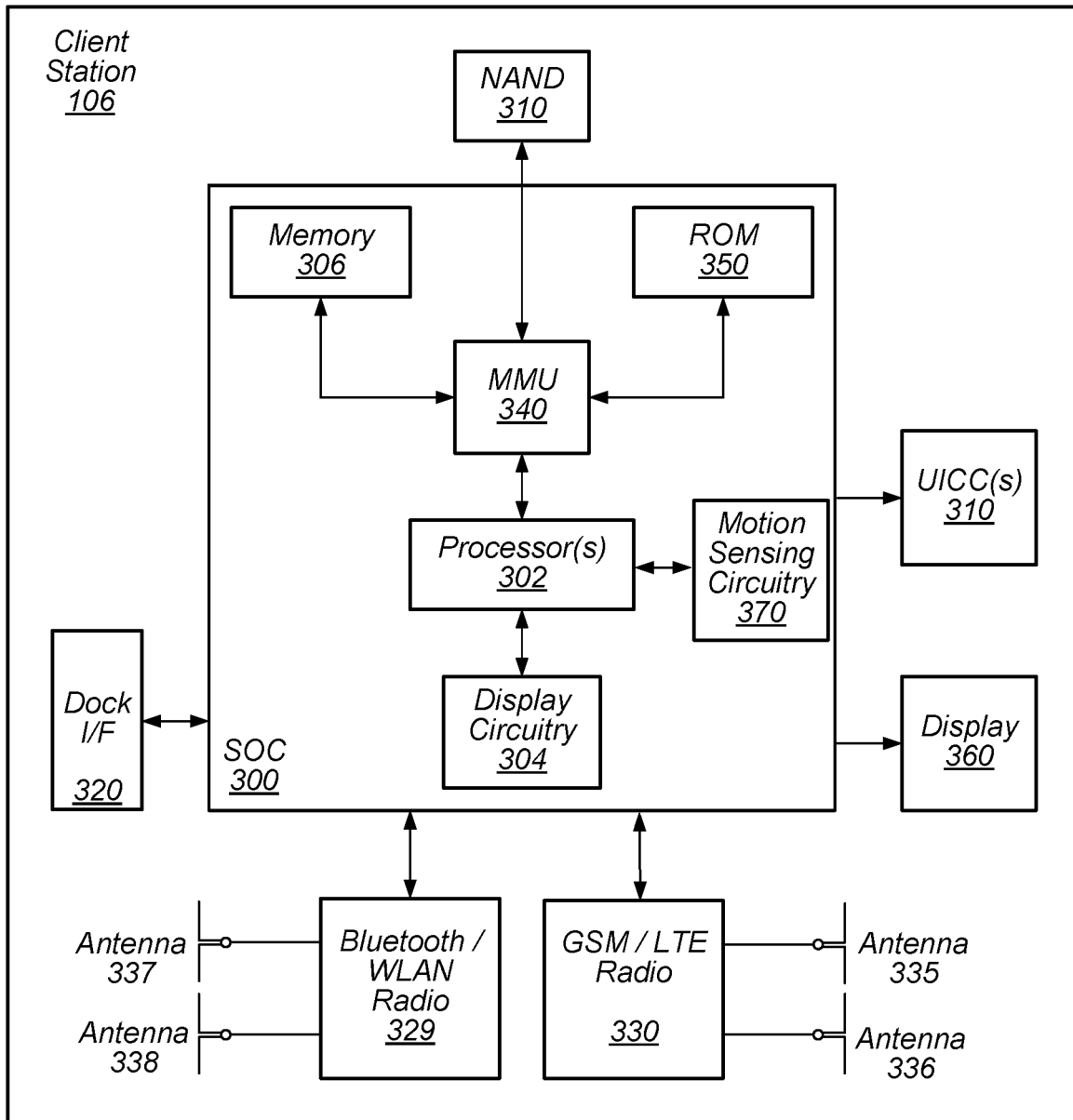
FIG. 3A illustrates an example simplified block diagram of a wireless station (UE), according to some embodiments.

FIG. 3A—Client Station Block Diagram

FIG. 3A illustrates an example simplified block diagram of a client station 106, which may be one possible exemplary implementation of the device 100 illustrated in FIG. 1B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1C or for ranging as shown in FIG. 1A. Further, in some embodiments, as further described below, client station 106 may be configured to perform error recovery for a ranging procedure. Thus, in some embodiments, the client station 106 may be configured to negotiate one or more ranging parameters that may include at least a set of secure training sequences. In addition, the client station 106 may receive a first ranging frame that may include a first dialog token. A first secure training sequence of the set of secure training sequences may appended to the first ranging frame. The client station 106 may determine that the first ranging frame can be decoded based on the first dialog token but not correlated based on the first secure training sequence. The client station 106 may transmit a first acknowledgment. A second secure training sequence of the set of secure training sequences may be appended to the first acknowledgment and the second secure training sequence may be associated with a prior dialog token. The client station 106 may receive a second ranging frame that may include a second dialog token. A third secure training sequence of the set of secure training sequences may be appended to the second ranging frame. The client station 106 may determine that the second ranging frame can be decoded based on the third dialog token and correlated based on the third secure training sequence.

In some embodiments, a client station 106 may negotiate one or more ranging parameters that may include at least a set of secure training sequences and may transmit a first ranging frame that may include a first dialog token. A first secure training sequence of the set of secure training sequences may be appended to the first ranging frame. The client station 106 may transmit a second ranging frame that may include a second dialog token. A second secure training sequence of the set of secure training sequences may be appended to the second ranging frame. The client station 106 may receive a first acknowledgment. A third secure training sequence of the set of secure training sequences may be appended to the first acknowledgment and the third secure training sequence may be associated with the first dialog token. The client station 106 may determine that the first acknowledgment can be decoded but cannot be correlated based on the third secure training sequence and may transmit a third ranging frame that may include a third dialog token. A fourth secure training sequence of the set of secure training sequences may be appended to the third ranging frame.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 3B:
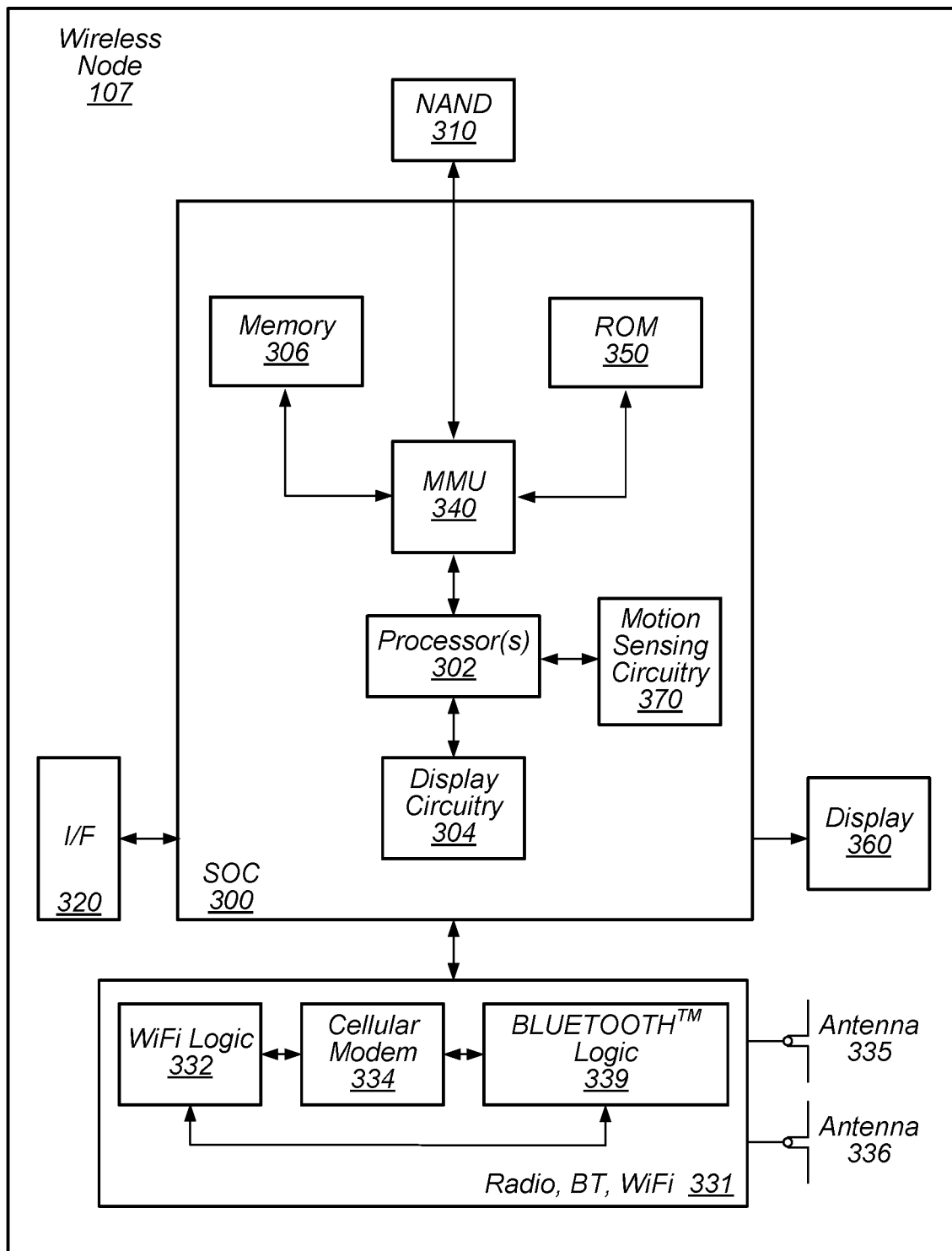
FIG. 3B illustrates an example simplified block diagram of a wireless node, according to some embodiments.

FIG. 3B—Wireless Node Block Diagram

FIG. 3B illustrates one possible block diagram of a wireless node 107, which may be one possible exemplary implementation of the device 100 illustrated in FIG. 1B. As shown, the wireless node 107 may include a system on chip (SOC) 300, which may include portions for various purposes. For example, as shown, the SOC 300 may include processor(s) 302 which may execute program instructions for the wireless node 107, and display circuitry 304 which may perform graphics processing and provide display signals to the display 360. The SOC 300 may also include motion sensing circuitry 370 which may detect motion of the wireless node 107, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the wireless node 107. For example, the wireless node 107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless node 107 may include at least one antenna, and in some embodiments, multiple antennas 335 and 336, for performing wireless communication with base stations and/or other devices. For example, the wireless node 107 may use antennas 33 and 336 to perform the wireless communication. As noted above, the wireless node 107 may in some embodiments be configured to communicate wirelessly using a plurality of wireless communication standards or radio access technologies (RATs).

The wireless communication circuitry 331 may include Wi-Fi Logic 332, a Cellular Modem 334, and Bluetooth Logic 339. The Wi-Fi Logic 332 is for enabling the wireless node 107 to perform Wi-Fi communications, e.g., on an 802.11 network. The Bluetooth Logic 339 is for enabling the wireless node 107 to perform Bluetooth communications. The cellular modem 334 may be capable of performing cellular communication according to one or more cellular communication technologies. Some or all components of the wireless communication circuitry 331 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 331 (e.g., Wi-Fi Logic 332) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, wireless node 107 may be configured to perform error recovery for a ranging procedure. Thus, in some embodiments, the wireless node 107 may be configured to negotiate one or more ranging parameters that may include at least a set of secure training sequences. In addition, the wireless node 107 may receive a first ranging frame that may include a first dialog token. A first secure training sequence of the set of secure training sequences may appended to the first ranging frame. The wireless node 107 may determine that the first ranging frame can be decoded based on the first dialog token but not correlated based on the first secure training sequence. The wireless node 107 may transmit a first acknowledgment. A second secure training sequence of the set of secure training sequences may be appended to the first acknowledgment and the second secure training sequence may be associated with a prior dialog token. The wireless node 107 may receive a second ranging frame that may include a second dialog token. A third secure training sequence of the set of secure training sequences may be appended to the second ranging frame. The wireless node 107 may determine that the second ranging frame can be decoded based on the third dialog token and correlated based on the third secure training sequence.

In some embodiments, a wireless node 107 may negotiate one or more ranging parameters that may include at least a set of secure training sequences and may transmit a first ranging frame that may include a first dialog token. A first secure training sequence of the set of secure training sequences may be appended to the first ranging frame. The wireless node 107 may transmit a second ranging frame that may include a second dialog token. A second secure training sequence of the set of secure training sequences may be appended to the second ranging frame. The wireless node 107 may receive a first acknowledgment. A third secure training sequence of the set of secure training sequences may be appended to the first acknowledgment and the third secure training sequence may be associated with the first dialog token. The wireless node 107 may determine that the first acknowledgment can be decoded but cannot be correlated based on the third secure training sequence and may transmit a third ranging frame that may include a third dialog token. A fourth secure training sequence of the set of secure training sequences may be appended to the third ranging frame.

Wireless Ranging

In some implementations, two wireless devices may engage in a ranging operation so that at least one of the wireless devices will be able to determine or estimate the range (e.g., distance) between the two devices, e.g., by measuring an amount of time that it takes to send messages between the devices. For example, the Fine Timing Measurement (FTM) protocol specified in 802.11-2016 may provide a time-of-flight based mechanism to perform ranging between two 802.11/Wi-Fi devices. In FTM, range may be determined as a function of several time instances (t1, t2, t3 and t4), where t1, t2, t3, and t4 correspond to the time of departure and time of arrival of measurement frames sent in both directions (e.g., uplink and downlink) between the two devices (e.g., the two STAs). Standards under development (e.g., 802.11az) may aim to improve and/or optimize the ranging protocols for a variety of use cases, including ranging using the VHTz mode, ranging using the HEz mode, and/or ranging in the 60 GHz band, among others.

Figure 4A:
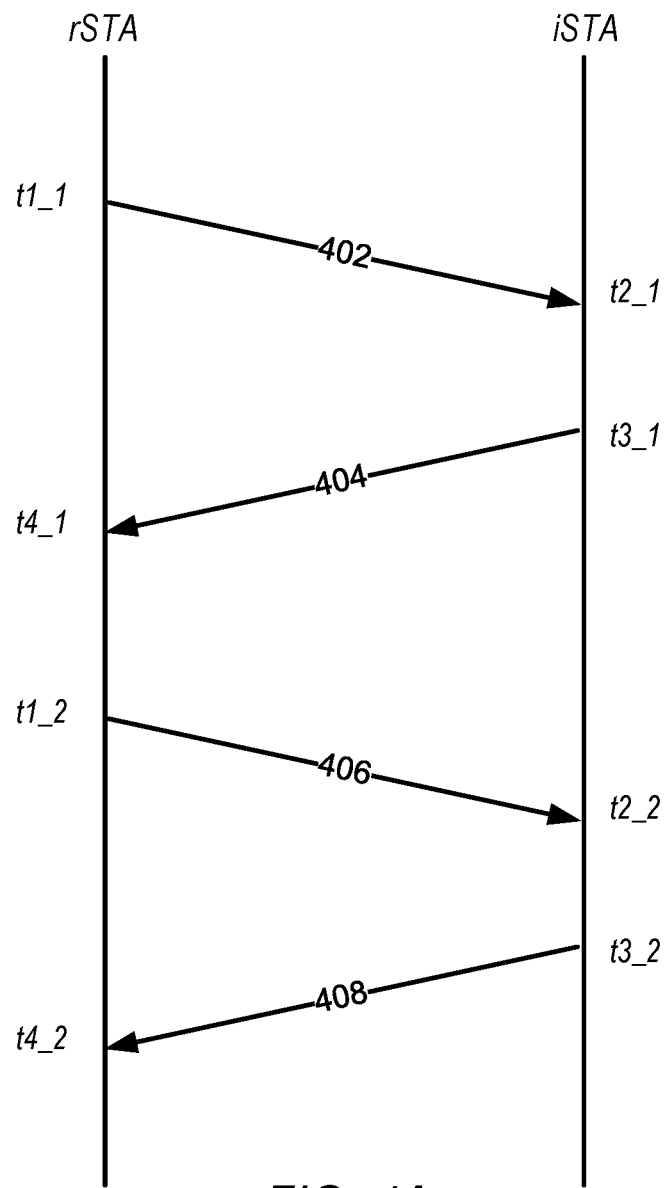
FIG. 4A illustrates a diagram of an example of signaling for a ranging procedure.

In some general ranging implementations, for example, as illustrated by FIG. 4A, two round trip equations may be used to solve two equations to determine a range between devices. As shown, after a negotiation (e.g., to determine a number of ranging measurement rounds and/or other parameters associated with a ranging procedure), a responding device (rSTA) may transmit a ranging message 402 to an initiating device (iSTA) at time t1_1. Note that the initiating device (or station) may be considered as the device that initiated the negotiation of the ranging procedure. The ranging message 402 may be a Fine Timing Measurement (FTM) frame that includes one or more time of departure (ToD) and time of arrival (ToA) timestamps captured during a prior measurement round. In addition, the FTM frame may include a dialog token that may be incremented with each measurement round. In addition, each FTM frame, as well as each acknowledgment frame, may include (or have appended) a known preamble (e.g., training sequence). The initiating device may receive the ranging message 402 at time t2_1. After processing the ranging message 402, the initiating device may transmit, at time t3_1, a response message 404 (e.g., an acknowledgment of ranging message 402). The responding device may receive the response message 404 at time t4_1. The responding device may process the response message 404 and may transmit a ranging message 406 at time t1_2. The ranging message 406 may include data (or timestamps) associated with times t1_1 and t4_1. The initiating device may receive the ranging message 406 at time t2_2. At this point, the initiating device may calculate a round trip time (RTT) based on t1_1, t2_1, t3_1, and t4_1. In addition, the initiating device may send a response message 408 to confirm receipt of ranging message 406. The responding device may receive the response message 408 at time t4_2. The process may be repeated for the remaining measurement rounds. In some implementations, if a transmission error occurs (e.g., an iSTA fails to receive a ranging message or an rSTA fails to receive a response message), a retransmission (e.g., of a ranging message) of the failed message may occur. In some implementations, the retransmission may be subject to the retransmission including identical ranging data as the missed transmission, the retransmission updating an included dialog token if the failed message included a non-zero dialog token, and the retransmission updating a sequence number in a medium access control (MAC) header.

Figure 4B:
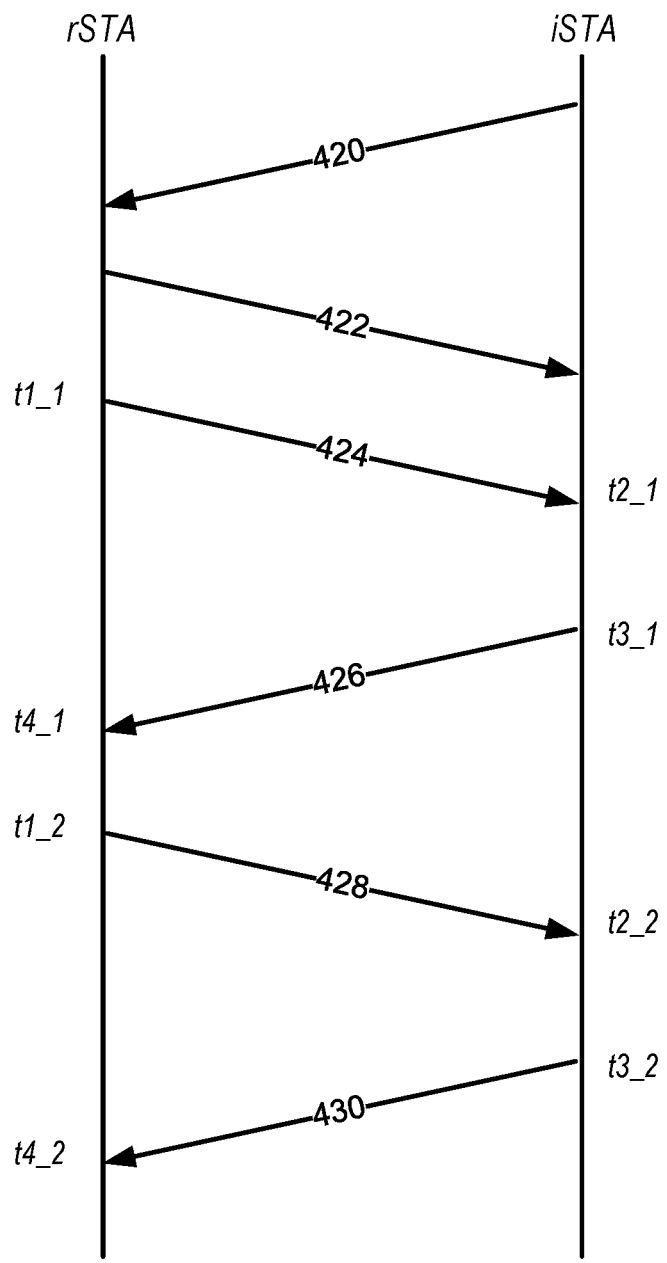
FIG. 4B illustrates a diagram of an example of signaling for a secured ranging procedure.

In some implementations, an initiating device may negotiate a secured ranging procedure with a responding device. In a secured ranging procedure, the initiating and responding devices negotiate random training sequences to exchange during the secured ranging procedure instead of the known training sequences included in an un-secured ranging procedure, e.g., as discussed above. For example, FIG. 4B illustrates a secured ranging procedure according to some implementations. As shown, an initiating device (iSTA) may transmit an initial FTM request 420 to a responding device (rSTA). The initial FTM request 420 may include FTM parameters as well as security parameters associated with a specific protocol such as directional multi gigabit (DMG) and/or enhanced DMG (EDMG). Upon receipt of FTM request 420, the rSTA may derive random (or pseudo-random) numbers r_Nonce and i_Nonce from an FTM pairwise transient key (PTK) and a hardware random number generator (RNG). Subsequently, the rSTA may transmit an acknowledgement message 422 to the iSTA. Then, at time t1_1, the rSTA may transmit FTM message 424 to the iSTA. The FTM message 424 may include a dialog token indicating a measurement round and may have an appended random training sequence associated with the dialog token. The iSTA may receive the FTM message 424 at time t2_1 and may decode the FTM message 424 to obtain the dialog token. Once the dialog token has been obtained, the iSTA may confirm (or correlate/cross correlate) the random training sequence. A time t3_1, the iSTA may transmit an acknowledge (ACK) message 426 and may append a random training sequence. The rSTA may receive the ACK message 426 at time t4_1. Subsequently, the rSTA may initiate a second round of measurements by transmitting FTM message 428 at time t1_2. FTM message 428 may include a dialog token indicating the measurement round and timestamps t1_1 and t4_1. In addition, the FTM message 428 may have an appended random training sequence associated with the dialog token. The iSTA may receive the FTM message 428 at time t2_2 and may decode the FTM message 428 to obtain the dialog token. Once the dialog token has been obtained, the iSTA may confirm (or correlate/cross correlate) the random training sequence. The iSTA may then calculate an RTT for the first measurement round based on the timestamps t1_1, t2_1, t3_1, and t4_1. Additionally, the iSTA may transmit ACK 430 at time t3_2. The ACK 430 may have a random training sequence appended by the iSTA. ACK 430 may be received by the rSTA at time t4_2. The process may be repeated until the negotiated number of measurement rounds have been completed.

Figure 4C:
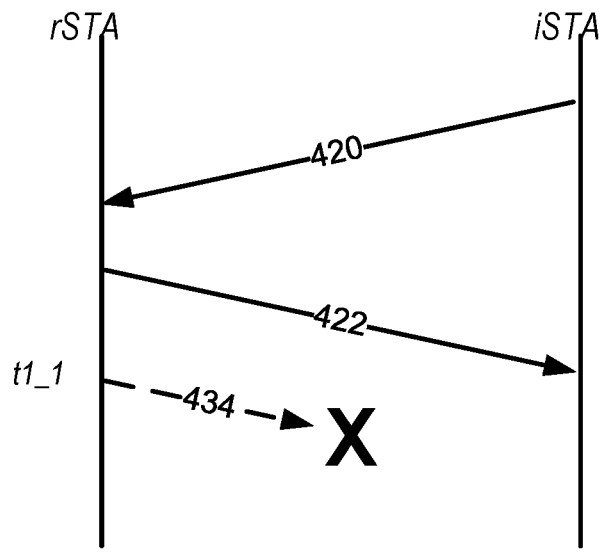
FIGS. 4C-4D illustrate diagrams of examples of signaling during failure of a secured ranging procedure.
Figure 4D:
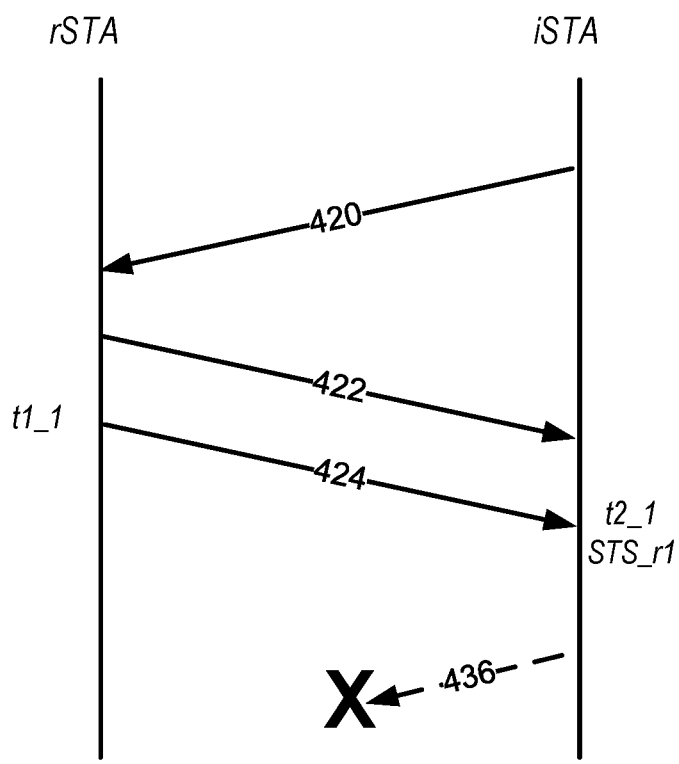

However, unlike an unsecured ranging procedure, if an error occurs during the secured ranging procedure (e.g., as illustrated by FIGS. 4C (failed FTM message 434) and 4D (failed ACK 436)), the rSTA/iSTA cannot simply retransmit the failed message (or frame) since the transmitting device cannot reuse the training sequence appended to the failed message. For example, a rogue (or attacking device) may jam an initial FTM transmission such that a receiving device cannot decode the FTM transmission. Then, if the transmitting device attempts to retransmit the initial FTM transmission with the same appended training sequence, the rogue device may be able to decode the retransmitted frame and/or perform a reply attack. Thus, upon retransmission, a new training sequence is required. However, this leads to the devices becoming out of sync and further may lead to failure of the ranging procedure.

FTM Secured Ranging Error Recovery

In some embodiments, an error recovery scheme for errors occurring during a secured Fine Timing Measurement (FTM) procedure may include one or more rules. In some embodiments, the one or more rules may include:

(1) If an FTM frame retransmission is successful, an initiating station may derive (or calculate) a round trip time (RTT) based on received time of departure (ToD) (e.g., t1 value) and time of arrival (ToA) (e.g., t4 value) values included in the retransmitted FTM frame and ToD (e.g., t3 value) and ToA (e.g., t2 value) values estimated locally in a prior (or preceding) fine timing measurement;

(2) During the FTM frame retransmission, a local ToA value estimated by the initiating station may not be used for an RTT calculation in a subsequent fine time measurement;

(3) During the FTM frame retransmission, the received ToD (e.g., estimated by the responding station) may not be included in a subsequent FTM frame;

(4) A fine timing measurement immediately after an FTM frame retransmission may not be used by an initiating station for an RTT calculation; and (5) A successful FTM frame retransmission may only be counted towards a total number of measurement rounds (e.g., a negotiated FTMs per burst value).

In some embodiments, the local ToA value may not be used for the RTT calculation in a subsequent fine timing measurement because the local ToA may have been estimated by correlating two unmatched secure random training sequences as a result of the FTM frame retransmission. Similarly, in some embodiments, the received ToD may not be included in the subsequent FTM frame because the received ToD may have been estimated by correlating two unmatched secure random training sequences as a result of the FTM frame retransmission. Further, in some embodiments, the fine timing measurement immediately after an FTM frame retransmission may not be used by an initiating station for an RTT calculation because both the local ToA and received ToD may have been estimated by correlating two unmatched secure random training sequences as a result of the FTM frame retransmission.

In some embodiments, FTM retransmissions may not be allowed during an FTM based secure ranging procedure. In such embodiments, to recover from a transmission error (e.g., resulting in a responding station not receiving an acknowledgement of an FTM frame transmission), a responding station may transmit a new FTM frame with an updated dialog token, no timestamp data, and a new secure random training sequence associated with the updated dialog token.

In some embodiments, a dialog token may be associated with a set of independent random sequences (RS) which may constitute a secure random training sequence (STS). For example, a dialog token, n, may be denoted as $DT_n$, and $DT_n$ may equal (or be defined as) the set of RSs, e.g., $DT_n = \{RS_{n,1}, RS_{n,2}, RS_{n,3}, \ldots RS_{n,M-1}, RS_{n,M}\}$ where M is a total number of independent sequences per STS used. In some embodiments, at least N×M independent random sequences may be required for an FTM measurement procedure, where N is a total number of FTM measurements to be successfully performed during the FTM measurement procedure. In some embodiments, to compensate for possible FTM frame retransmissions, N may be increased to a value P, and P×M independent random sequences may be generated to further ensure completion of an FTM measurement procedure without exhaustion of the random sequences. Note that in some embodiments, if a number of random sequences used is approaching P (e.g., within a specified threshold or percentage of P and/or when a threshold number or percentage of the random sequences have been used), an FTM measurement procedure may be aborted and a new FTM procedure (or session) may need to be negotiated (or re-negotiated). In some embodiments, one or both of the initiating device and responding device may confirm (or detect) whether an STS used to correlate received signals is correct. In some embodiments, confirmation (or detection) methods may include any or all of:

(1) A comparison of channel impulse responses obtained from multiple received signals (e.g., FTM frames for an initiating station, acknowledgment frames for a responding station);

(2) A check of channel tap delay of a channel impulse response; and/or (3) A check of whether a dialog token matches an STS.

Figure 5A:
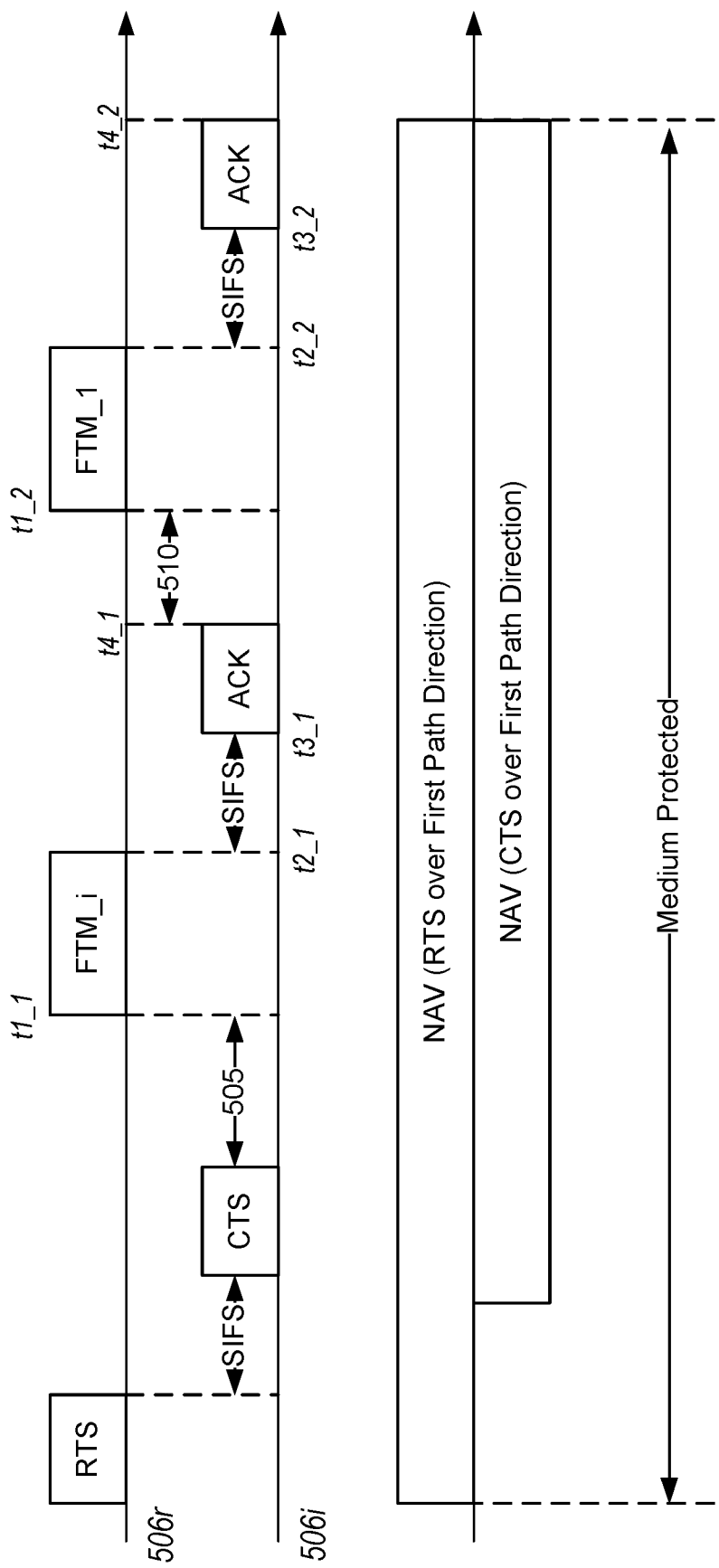
FIG. 5A illustrates an example of a timeline and frame exchange between an initiating station and a responding station, according to some embodiments.

In some embodiments, one or both of the initiating station and responding station may track a time within which receipt of a frame is expected. For example, FIG. 5A illustrates an example of a timeline and frame exchange between an initiating station and a responding station, according to some embodiments. As shown, a responding station (e.g., 506r) may transmit a request to send (RTS) to an initiating station (e.g., 506i) and start a network allocation vector (NAV) time reserving the medium over a path direction for an expected time period of the FTM procedure. Upon reception of the RTS and after a short interframe space (SIFS), the initiating station may transmit a clear to send (CTS) to the responding station and start a network allocation vector (NAV) time reserving the medium over a path direction for an expected time period of the FTM procedure. Note that the RTS may be sent after a negotiation in which the initiating station may have initiated a ranging procedure (e.g., via transmission of an FTM request). Note further that both the initiating station and/or responding station may be a device such as devices 106, 107, and/or 112 described above. In addition, in some embodiments, the RTS and/or the CTS frames may be used to ensure medium access (e.g., during the NAV) and allow for more precise tracking of arrival times (e.g., time in which receipt of a frame is expected). In some embodiments, RTS/CTS frames may be used to make the expected time period for arrival deterministic which may lead to quicker recovery (e.g., fewer transmissions prior to receiving data useable to calculate an RTT). Note that in some embodiments, if RTS/CTS frames are not used, accuracy of tracking expecting time of arrival may be reduced due to medium contention/congestion. In some embodiments, the FTM request may include FTM parameters (e.g., priority and/or number of FTMs per burst) as well as security parameters associated with a specific protocol. The responding station may receive the FTM request and respond with transmission of an acknowledgment that may indicate that the FTM request has been received by the responding station. Once the medium has been reserved, e.g., after a negotiated or predefined time period 505, the responding station may transmit a first FTM frame (e.g., FTM_i) at time t1_1. The initiating station may receive the first FTM frame at t2_1 and may transmit an acknowledgment (e.g., ACK) after a SIFS at time t3_1. As shown, the responding station may track expected time of arrival of the acknowledgement. In other words, the responding station may expect to receive the acknowledgement within the time period 510. In some embodiments, if an expected frame is not received within an expected time period, a receiving station may use an STS associated with a next dialog token to correlate a next received frame. For example, if an initiating station does not receive an expected FTM frame within a specified time period after transmitting an acknowledgment frame, the initiating station may switch to using an STS associated with a next dialog token in its subsequent reception of an FTM frame. In such a case, a responding station (which would not have received an acknowledgment frame for the FTM frame), may retransmit the FTM frame with the STS associated with the next dialog token.

As shown, the acknowledgement frame may be received at time t4_1 (e.g., within the expected timeframe 510) and the responding station may initiate another measurement round via transmission of a second FTM frame (e.g., FTM_1) at time t1_2. The initiating station may receive the second FTM frame at time t1_2 and transmit an acknowledgment at time t3_2. The acknowledgment may be received by the responding station at time t4_2, which may be within the expected timeframe for receipt of the acknowledgement. In some embodiments, one or both of the initiating station and responding station may use additional correlators to further expedite error recovery. For example, in addition to tracking expected arrival time, the stations may implement two correlators that use STSs corresponding to a current and next dialog token in confirming/correlating incoming STS which may maximize chances of obtaining a correct estimate of time-of-arrival of the incoming STS.

Figure 5B:
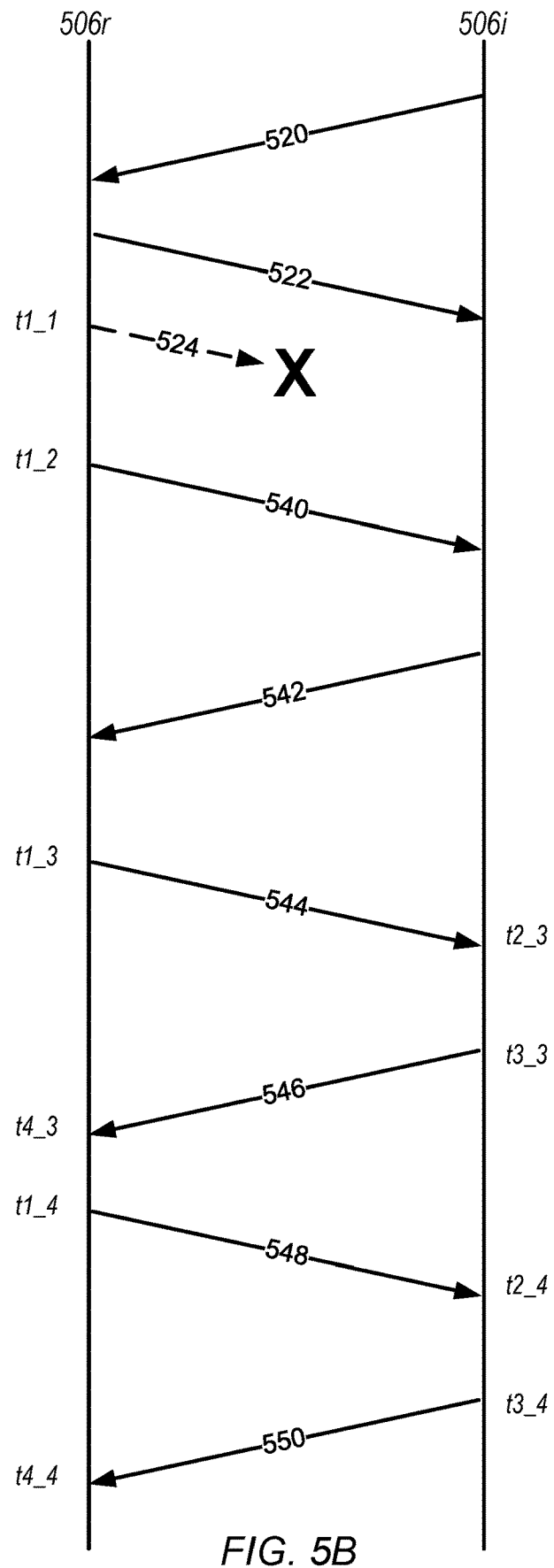
FIGS. 5B-5C illustrate various examples of error recovery for an FTM based secure ranging procedure, according to some embodiments.
Figure 5C:
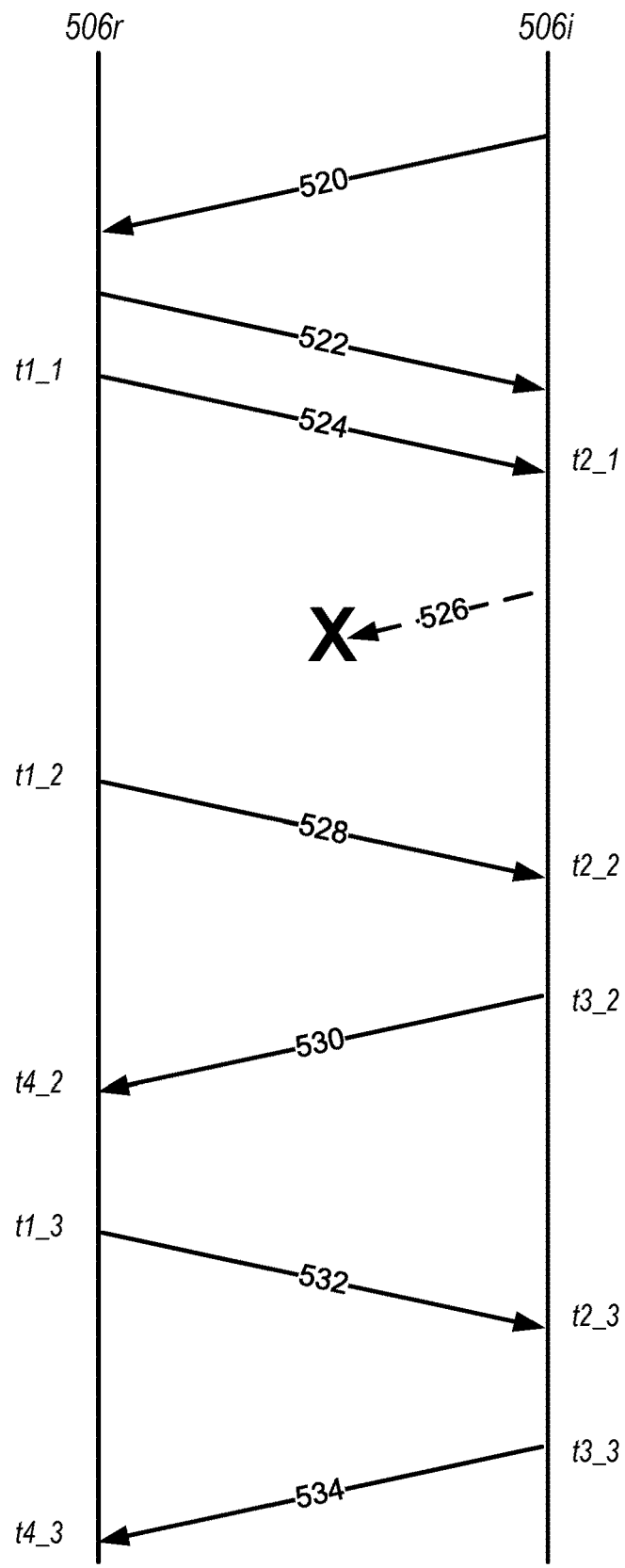

FIGS. 5B-5C illustrate various examples of error recovery for an FTM based secure ranging procedure, according to some embodiments. The signaling shown in FIGS. 5B-5C may be used in conjunction with any of the systems or devices shown in the above Figures, among other devices. In various embodiments, some of the signaling shown may be performed concurrently, in a different order than shown, or may be omitted. Additional signaling may also be performed as desired.

Turning to FIG. 5B, FIG. 5B illustrates an example of recovery from a missed FTM frame transmission, according to some embodiments. As shown, an initiating station (e.g., 506i), may initiate a ranging procedure via transmission of an FTM request 520. The initiating station may be a device such as devices 106, 107, and/or 112 described above. In some embodiments, the FTM request 520 may include FTM parameters (e.g., priority and/or number of FTMs per burst) as well as security parameters associated with a specific protocol. A responding station (e.g., 506r) may receive the FTM request 520 and respond with transmission of an acknowledgment (ACK) frame 522. The responding station may be a device such as devices 106, 107, and/or 112 described above. The ACK frame 522 may indicate that the FTM request 520 has been received by the rSTA 506r.

At time t1_1, device 506r may transmit an FTM frame 524. The FTM frame 524 may include one or more null timestamps, FTM parameters, protocol specific parameters, and a first dialog token (DT_1) associated with a first measurement round. In addition, a secure random training sequence (STS_r1) associated with DT_1 may be appended to FTM frame 524. Device 506i may be expecting to receive the FTM frame 524 with DT_1 and appended STS_r1. However, as shown, reception of FTM frame 524 may fail. Thus, in response to not receiving an ACK frame for FTM frame 524, device 506r may retransmit FTM frame 524 as FTM frame 540 at time t1_2. FTM frame 540 may include one or more null timestamps, FTM parameters, protocol specific parameters and a second dialog token (DT_2) associated with a second measurement round. In addition, a secure random training sequence (STS_r2) associated with DT_2 may be appended to frame 540. However, device 506i may still expect an FTM frame with DT_1 and STS_r1. Thus, correlation of FTM frame 540 may fail, however, device 506i may decode the FTM frame 540 with dialog token DT_2. Note that since correlation failed, device 506i may not record a timestamp value (e.g., t2_2) for receipt of FTM frame 540. Further, since device 506i successfully decoded FTM frame 540, an ACK frame 542 may be transmitted to device 506r with an appended secure random training sequence STS_i1. Note that since correlation of FTM frame 540 failed, device 506i may not record a timestamp value (e.g., t3_2) associate with transmission of ACK frame 542.

Upon receipt of the ACK frame 542, device 506r may decode the ACK frame 542, however, correlation may fail as device 506r may be expecting a secure random training sequence STS_i2 associated with DT_2. Note that since correlation failed, device 506r may not record a timestamp value (e.g., t4_2) associated with receipt of ACK frame 542.

At this point, devices 506i and 506r may both be considered recovered from the error of non-receipt of FTM frame 524. Thus, at time t1_3, device 506r may transmit FTM frame 544 which may include one or more null timestamps, FTM parameters, protocol specific parameters and a third dialog token (DT_3) associated with a third measurement round. In addition, a secure random training sequence (STS_r3) associated with DT_3 may be appended to FTM frame 544.

Further, at time t2_3, device 506i may receive FTM frame 544 and may successfully decode and correlate FTM frame 544 (e.g., since device 506i is expecting secure random training sequence STS_r3). At time t3_3, device 506i may transmit ACK frame 546 with an appended secure random training sequence STS_i3 associated with DT_3. At time t4_3, device 506r may receive ACK frame 546 and may successfully decode and correlate ACK frame 546 (e.g., since device 506r is expecting secure random training sequence STS_i3).

At time t1_4, device 506r may transmit FTM frame 548 which may include timestamps associated with times T1_3 and t4_3, FTM parameters, protocol specific parameters and a fourth dialog token (DT_4) associated with a fourth measurement round. In addition, a secure random training sequence (STS_r4) associated with DT_4 may be appended to FTM frame 548.

Further, at time t2_4, device 506i may receive FTM frame 548 and may successfully decode and correlate FTM frame 548 (e.g., since device 506i is expecting secure random training sequence STS_r4). At time t3_4, device 506i may transmit ACK frame 550 with an appended secure random training sequence STS_i4 associated with DT_4. In addition, device 506i may calculate a round trip time (RRT) associated with timestamps t1_3, t2_3, t3_3, and t4_3. At time t4_4, device 506r may receive ACK frame 550 and may successfully decode ACK frame 550 and correlate STS (e.g., since device 506r is expecting secure random training sequence STS_i4). The signaling may then be repeated until a negotiated number of FTMs per burst has been completed.

FIG. 5C illustrates an example of recovery from a missed ACK frame transmission, according to some embodiments. As shown, an initiating station (e.g., 506i), may initiate a ranging procedure via transmission of an FTM request 520. The initiating station may be a device such as devices 106, 107, and/or 112 described above. In some embodiments, the FTM request 520 may include FTM parameters (e.g., priority and/or number of FTMs per burst) as well as security parameters associated with a specific protocol. A responding station (e.g., 506r) may receive the FTM request 520 and respond with transmission of an acknowledgment (ACK) frame 522. The responding station may be a device such as devices 106, 107, and/or 112 described above. The ACK frame 522 may indicate that the FTM request 520 has been received by the rSTA 506r.

At time t1_1, device 506r may transmit an FTM frame 524. The FTM frame 524 may include one or more null timestamps, FTM parameters, protocol specific parameters and a first dialog token (DT_1) associated with a first measurement round. In addition, a secure random training sequence (STS_r1) associated with DT_1 may be appended to FTM frame 524. Device 506i may be expecting to receive the FTM frame 524 with DT_1 and STS_r1 and may receive the FTM frame 524 at time t2_1 and successfully correlate and decode FTM frame 542. However, as shown, ACK frame 526 may not be received by device 506r. Thus, in response to not receiving an ACK frame for FTM frame 524, device 506r may retransmit FTM frame 524 as FTM frame 528 at time t1_2. FTM frame 528 may include one or more null timestamps, FTM parameters, protocol specific parameters and a second dialog token (DT_2) associated with a second measurement round. In addition, a secure random training sequence (STS_r2) associated with DT_2 may be appended to FTM frame 528. Device 506i may be expecting an FTM frame with DT_2 and STS_r2; thus, correlation of FTM frame 528 may be successful and device 506i may record time of receipt of FTM frame 528 at t2_2. ACK frame 530 may be transmitted to device 506r at time t3_2 with an appended secure random training sequence STS_i2. At time t4_2, device 506r may receive and successfully decode ACK frame 530 (e.g., since device 506r is expecting training sequence STS_i2).

At this point, devices 506i and 506r may both be considered recovered from the error of non-receipt of ACK frame 526. Thus, at time t1_3, device 506r may transmit FTM frame 532 which may include one or more timestamps associated times t1_2 and t4_2, FTM parameters, protocol specific parameters and a third dialog token (DT_3) associated with a third measurement round. In addition, a secure random training sequence (STS_r3) associated with DT_3 may be appended to FTM frame 532.

Further, at time t2_3, device 506i may receive FTM frame 532 and may successfully decode and correlate FTM frame 532 (e.g., since device 506i is expecting secure random training sequence STS_r3). In addition, device 506i may calculate a round trip time (RRT) associated with timestamps t1_2, t2_2, t3_2, and t4_2. At time t3_3, device 506i may transmit ACK frame 534 with an appended secure random training sequence STS_i3 associated with DT_3. At time t4_3, device 506r may receive ACK frame 534 and may successfully decode and correlate ACK frame 546 (e.g., since device 506r is expecting secure random training sequence STS_i3). The signaling may then be repeated until a negotiated number of FTMs per burst has been completed.

Figure 6:
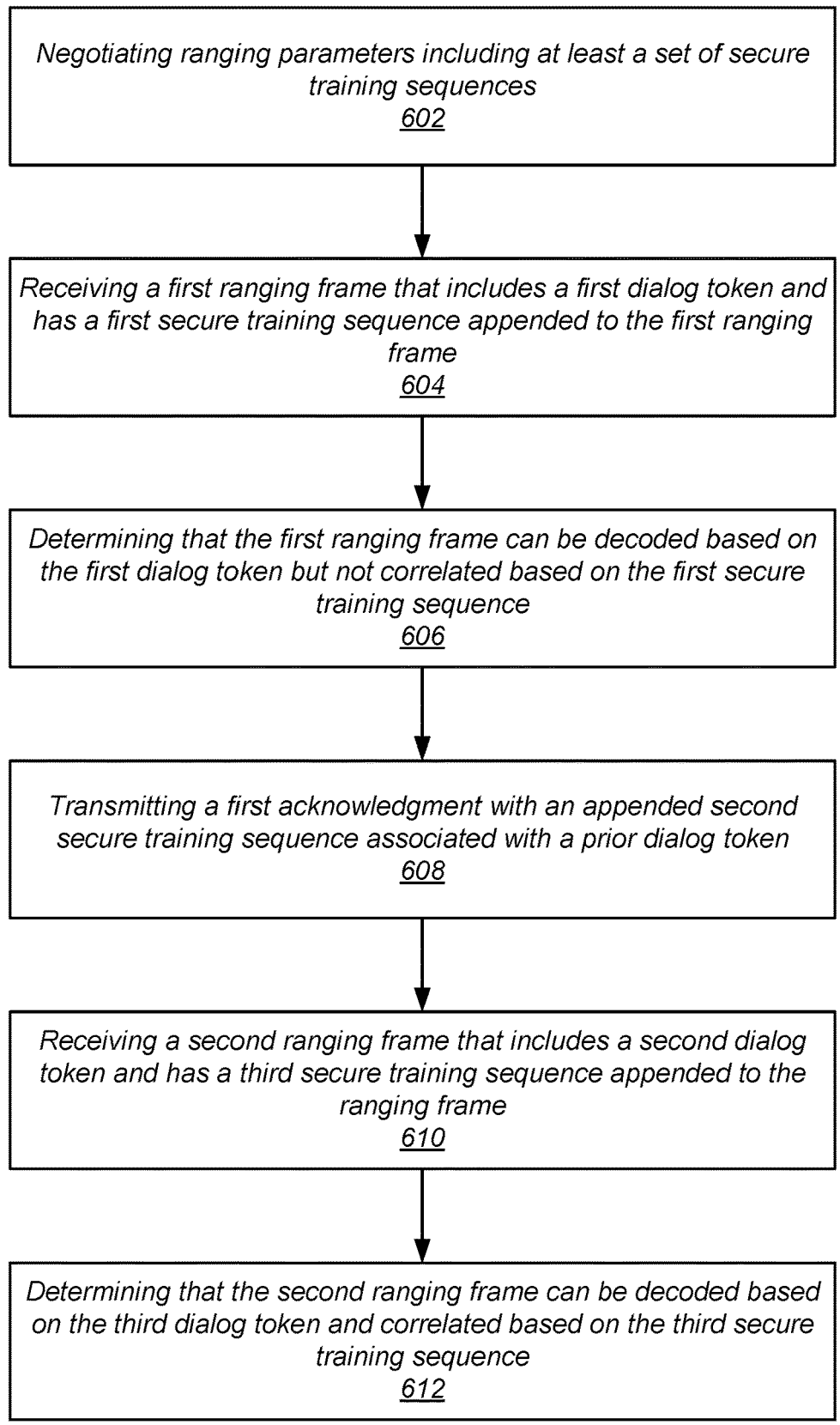
FIG. 6 illustrates a block diagram of an example of a method for error recovery for an FTM based secure ranging procedure, according to some embodiments.

FIG. 6 illustrates a block diagram of an example of a method for error recovery for an FTM based secure ranging procedure, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, ranging parameters for a secure ranging procedure may be negotiated. In some embodiments, the negotiation may be between an initiating station and a responding station. In some embodiments, either or both of the initiating station and/or responding station may be a device such as devices 106, 107, and/or 112 described above. In some embodiments, the parameters may include at least a set of secure training sequences. In some embodiments, negotiating the ranging parameters may include determining a number of measurement rounds, wherein each measurement round corresponds to a calculation of a round trip time (RTT). In some embodiments, each secure training sequence of the set of secure training sequences may be specified by a set of independent random sequences.

At 604, a first ranging frame may be received. The first ranging frame may include a first dialog token. In addition, a first secure training sequence of the set of secure training sequences may be appended to the first ranging frame. In some embodiments, the first ranging frame may include null timestamps and one or more parameters associated with a ranging protocol. In some embodiments, the first ranging frame may be a Fine Timing Measurement (FTM) frame.

At 606, it may be determined that the first ranging frame can be decoded but not correlated. In some embodiments, decoding the first ranging frame may be based, at least in part, on the first dialog token. In some embodiments, correlating the first ranging frame may be based, at least in part, on the first secure training sequence. In some embodiments, the first ranging frame may not be correlated based, at least in part, on the first secure training sequence not matching an expected secure training sequence. For example, the first secure training sequence may be compared to the expected secure training sequence from the set of secure training sequences. Based on the comparison, it may be determined that the expected secure training sequence is not associated with the first dialog token.

At 608, a first acknowledgment of the first ranging frame may be transmitted. A second secure training sequence of the set of secure training sequences may be appended to the first acknowledgement. In addition, the second secure training sequence may be associated with a prior dialog token (e.g., a dialog token received prior to the first dialog token, for example, as part of a prior measurement round).

At 610, a second ranging frame may be received. The second ranging frame may include a second dialog token. In addition, a third secure training sequence of the set of secure training sequences may be appended to the second ranging frame. In some embodiments, the second ranging frame may include null timestamps and one or more parameters associated with a ranging protocol. In some embodiments, the second ranging frame may be a Fine Timing Measurement (FTM) frame.

At 612, it may be determined that the second ranging frame can be decoded and correlated. In some embodiments, decoding the second ranging frame may be based, at least in part, on the second dialog token. In some embodiments, correlating the second ranging frame may be based, at least in part, on the third secure training sequence. In some embodiments, the second ranging frame may be correlated based, at least in part, on the third secure training sequence matching an expected secure training sequence.

In some embodiments, a second acknowledgment (e.g., of the second ranging frame) may be transmitted. Further, a third ranging frame may be received. In some embodiments, the third ranging frame may include timestamps associated with transmission of the second ranging frame and reception of the second acknowledgement. In some embodiments, a round trip time may be calculated based on the received timestamps associated with transmission of the second ranging frame and reception of the second acknowledgement and local timestamps associated with reception of the second ranging frame and transmission of the second acknowledgement.

In some embodiments, the first and second ranging frames may each include null timestamps and one or more parameters associated with a ranging protocol. In some embodiments, timestamps associated with receipt of the first ranging frame and transmission of the first acknowledgment may not be used to calculate a round trip time (RTT). In some embodiments, correlating a secure training sequence may include any, any combination of (e.g., one or more of), and/or all of comparing channel impulse responses obtained from different received ranging frames, determining a channel tap delay of a channel impulse response, and/or determining a dialog token associated with the secure training sequence was received.

Figure 7:
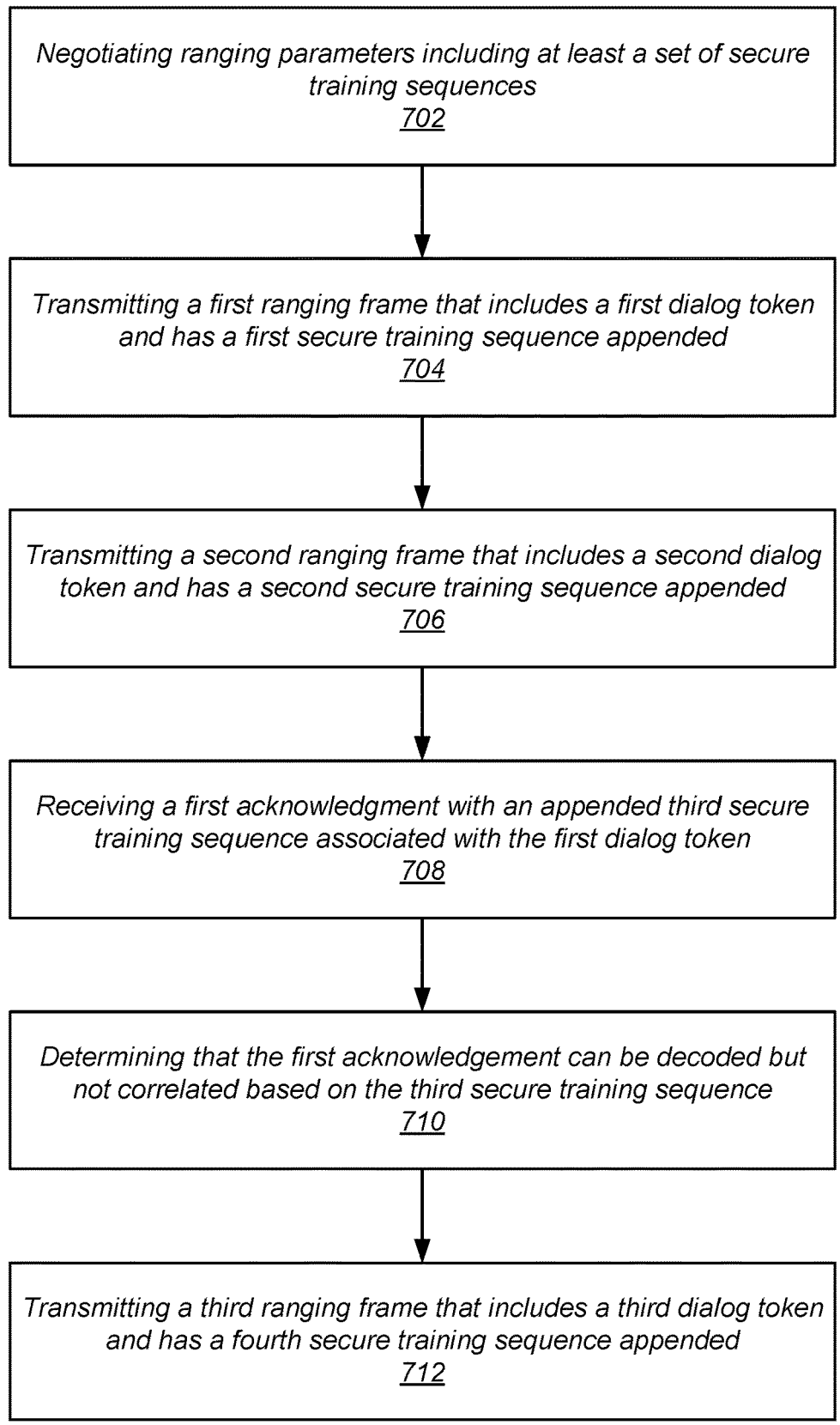
FIG. 7 illustrates a block diagram of another example of a method for error recovery for an FTM based secure ranging procedure, according to some embodiments.

FIG. 7 illustrates a block diagram of another example of a method for error recovery for an FTM based secure ranging procedure, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, ranging parameters for a secure ranging procedure may be negotiated. In some embodiments, the negotiation may be between an initiating station and a responding station. In some embodiments, either or both of the initiating station and/or responding station may be a device such as devices 106, 107, and/or 112 described above. In some embodiments, the parameters may include at least a set of secure training sequences. In some embodiments, negotiating the ranging parameters may include determining a number of measurement rounds, wherein each measurement round corresponds to a calculation of a round trip time (RTT). In some embodiments, each secure training sequence of the set of secure training sequences may be specified by a set of independent random sequences.

At 704, a first ranging frame may be transmitted. The first ranging frame may include a first dialog token. In addition, a first secure training sequence of the set of secure training sequences may be appended to the first ranging frame. In some embodiments, the first ranging frame may include null timestamps and one or more parameters associated with a ranging protocol. In some embodiments, the first ranging frame may be a Fine Timing Measurement (FTM) frame.

At 706, a second ranging frame may be transmitted. The second ranging frame may include a second dialog token. In addition, a second secure training sequence of the set of secure training sequences may be appended to the second ranging frame. In some embodiments, the second ranging frame may include null timestamps and one or more parameters associated with a ranging protocol. In some embodiments, the second ranging frame may be a Fine Timing Measurement (FTM) frame.

At 708, a first acknowledgment of the second ranging frame may be received. A third secure training sequence of the set of secure training sequences may be appended to the first acknowledgment. In addition, the third secure training sequence may be associated with the dialog token.

At 710, it may be determined that the first acknowledgement can be decoded but not correlated. In some embodiments, decoding the first acknowledgment may be based, at least in part, on the first dialog token. In some embodiments, correlating the first ranging frame may be based, at least in part, on the third secure training sequence. In some embodiments, the first acknowledgement may not be correlated based, at least in part, on the third secure training sequence not matching an expected secure training sequence. For example, the third secure training sequence may be compared to the expected secure training sequence from the set of secure training sequences. Based on the comparison, it may be determined that the expected secure training sequence is not associated with the first dialog token.

At 712, a third ranging frame may be transmitted. The third ranging frame may include a third dialog token. In addition, a fourth secure training sequence of the set of secure training sequences may be appended to the third ranging frame. In some embodiments, the third ranging frame may include null timestamps and one or more parameters associated with a ranging protocol. In some embodiments, the third ranging frame may be a Fine Timing Measurement (FTM) frame.

In some embodiments, a second acknowledgment (e.g., of the second ranging frame) may be received. Further, a fourth ranging frame may be transmitted. In some embodiments, the fourth ranging frame may include timestamps associated with transmission of the third ranging frame and reception of the second acknowledgement.

In some embodiments, the first and second ranging frames may each include null timestamps and one or more parameters associated with a ranging protocol. In some embodiments, correlating a secure training sequence may include any, any combination of (e.g., one or more of), and/or all of comparing channel impulse responses obtained from different received ranging frames, determining a channel tap delay of a channel impulse response, and/or determining a dialog token associated with the secure training sequence was received.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio communicatively coupled to the antenna and configured to perform wireless communications according to at least one radio access technology (RAT);
   at least one processor communicatively coupled to the at least one radio, wherein the wireless device is configured to perform voice and/or data communications;
   wherein the at least one processor is configured to cause the wireless device to:
      negotiate one or more ranging parameters comprising at least a set of secure training sequences, wherein each secure training sequence of the set of secure training sequences is specified by a set of independent random sequences;
      determine that a first ranging frame received from a neighboring wireless device can be decoded based on an included first dialog token but cannot be correlated based on an appended first secure training sequence of the set of secure training sequences;
      transmit a first acknowledgment with an appended second secure training sequence of the set of secure training sequences to the neighboring wireless device, wherein the second secure training sequence is associated with a prior dialog token; and
      determine that a second ranging frame received from the neighboring wireless device can be decoded based on an included second dialog token and can be correlated based on an appended third secure training sequence of the set of secure training sequences.

2. The wireless device of claim 1,
wherein, to determine that the first ranging frame cannot be correlated, the at least one processor is further configured to cause the wireless device to:
   compare the first secure training sequence to an expected secure training sequence of the set of secure training sequences; and
   determine that the expected secure training sequence is not associated with the first dialog token.

3. The wireless device of claim 1,
wherein the at least one processor is further configured to cause the wireless device to:
   transmit a second acknowledgment; and
   receive a third ranging frame from the neighboring wireless device, wherein the third ranging frame includes timestamps associated with transmission of the second ranging frame and reception of the second acknowledgement.

4. The wireless device of claim 3,
wherein the at least one processor is further configured to cause the wireless device to:
   calculate a round trip time based on the received timestamps associated with transmission of the second ranging frame and reception of the second acknowledgement and local timestamps associated with reception of the second ranging frame and transmission of the second acknowledgement.

5. The wireless device of claim 1,
wherein the first and second ranging frames each include null timestamps and one or more parameters associated with a ranging protocol.

6. The wireless device of claim 1,
wherein the first ranging frame is a Fine Timing Measurement (FTM) frame.

7. The wireless device of claim 1,
wherein timestamps associated with receipt of the first ranging frame and transmission of the first acknowledgment are not used to calculate a round trip time.

8. The wireless device of claim 1,
wherein the one or more ranging parameters further comprise a number of measurement rounds, wherein each measurement round corresponds to a calculation of a round trip time RTT.

9. The wireless device of claim 1,
where, to correlate a secure training sequence, the at least one processor is further configured to cause the wireless device to perform one or more of:
   comparing channel impulse responses obtained from different received ranging frames;
   determining a channel tap delay of a channel impulse response; and/or
   determining a dialog token associated with the secure training sequence was received.

10. An apparatus, comprising:
a memory; and
at least one processor in communication with the memory, wherein the at least one processor is configured to:
   determine that a first ranging frame received from a neighboring wireless device can be decoded based on an included first dialog token but cannot be correlated based on an appended first secure training sequence of a set of secure training sequences, wherein the set of secure training sequences is negotiated prior to receipt of the first ranging frame, wherein each secure training sequence of the set of secure training sequences is specified by a set of independent random sequences, and wherein correlating the first secure training sequence includes at least one of comparing channel impulse responses obtained from different received ranging frames, determining a channel tap delay of a channel impulse response, or determining a dialog token associated with the secure training sequence was received;

generate instructions to cause a first acknowledgment with an appended second secure training sequence of the set of secure training sequences to be transmitted to the neighboring wireless device, wherein the second secure training sequence is associated with a prior dialog token; and determine that a second ranging frame received from the neighboring wireless device can be decoded based on an included second dialog token and can be correlated based on an appended third secure training sequence of the set of secure training sequences.

11. The apparatus of claim 10,
wherein, to determine that the first ranging frame cannot be correlated, the at least one processor is further configured to:
compare the first secure training sequence to an expected secure training sequence of the set of secure training sequences; and
determine that the expected secure training sequence is not associated with the first dialog token.

12. The apparatus of claim 10,
wherein the at least one processor is further configured to:
generate instructions to cause a second acknowledgment to be transmitted to the neighboring wireless device;
receive a third ranging frame from the neighboring wireless device, wherein the third ranging frame includes timestamps associated with transmission of the second ranging frame and reception of the second acknowledgement; and
calculate a round trip time based on the received timestamps associated with transmission of the second ranging frame and reception of the second acknowledgement and local timestamps associated with reception of the second ranging frame and transmission of the second acknowledgement.

13. The apparatus of claim 10,
wherein the first and second ranging frames each include null timestamps and one or more parameters associated with a ranging protocol.

14. The apparatus of claim 10,
wherein the first ranging frame is a Fine Timing Measurement (FTM) frame.

15. The apparatus of claim 10,
wherein timestamps associated with receipt of the first ranging frame and transmission of the first acknowledgment are not used to calculate a round trip time.

16. The apparatus of claim 10,
wherein the one or more ranging parameters further comprise a number of measurement rounds, wherein each measurement round corresponds to a calculation of a round trip time RTT.

17. A non-transitory computer readable memory medium storing program instructions executable by processing circuitry of a wireless device to:

negotiate one or more ranging parameters comprising at least a set of secure training sequences;

receive a first ranging frame comprising a first dialog token, wherein a first secure training sequence of the set of secure training sequences is appended to the first ranging frame;

determine that first ranging frame can be decoded based on the first dialog token but not correlated based on the first secure training sequence;

generate instructions to cause a first acknowledgment to be transmitted with an appended second secure training sequence of the set of secure training sequences, wherein the second secure training sequence is associated with a prior dialog token;

receive a second ranging frame comprising a second dialog token, wherein a third secure training sequence of the set of secure training sequences is appended to the second ranging frame; and determine that the second ranging frame can be decoded based on the third dialog token and correlated based on the third secure training sequence.

18. The non-transitory computer readable memory medium of claim 17,
wherein, to determine that the first ranging frame cannot be correlated, the program instructions are further executable to:
compare the first secure training sequence to an expected secure training sequence of the set of secure training sequences; and
determine that the expected secure training sequence is not associated with the first dialog token.

19. The non-transitory computer readable memory medium of claim 17,
wherein the program instructions are further executable to:
generate instructions to cause a second acknowledgment to be transmitted to the neighboring wireless device;
receive a third ranging frame from the neighboring wireless device, wherein the third ranging frame includes timestamps associated with transmission of the second ranging frame and reception of the second acknowledgement; and
calculate a round trip time based on the received timestamps associated with transmission of the second ranging frame and reception of the second acknowledgement and local timestamps associated with reception of the second ranging frame and transmission of the second acknowledgement.

20. The non-transitory computer readable memory medium of claim 17,
wherein correlating a secure training sequence comprises one or more of:
comparing channel impulse responses obtained from different received ranging frames;
determining a channel tap delay of a channel impulse response; and/or
determining a dialog token associated with the secure training sequence was received.

* * * * *